United States Patent
Yin

(10) Patent No.: US 8,432,991 B2
(45) Date of Patent: Apr. 30, 2013

(54) MEASUREMENT PROCESSING METHOD AND APPARATUS

(75) Inventor: Liyan Yin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 678 days.

(21) Appl. No.: 12/579,721

(22) Filed: Oct. 15, 2009

(65) Prior Publication Data

US 2010/0034096 A1 Feb. 11, 2010

Related U.S. Application Data

(63) Continuation of application No. PCT/CN2008/070650, filed on Apr. 1, 2008.

(30) Foreign Application Priority Data

Apr. 17, 2007 (CN) .......................... 2007 1 0074081

(51) Int. Cl.
*H04B 7/02* (2006.01)
*H04L 1/02* (2006.01)

(52) U.S. Cl.
USPC .......................................... 375/267; 375/224

(58) Field of Classification Search .................. 375/219, 375/224, 260, 267
See application file for complete search history.

(56) References Cited

U.S. PATENT DOCUMENTS

| 7,373,128 | B2 * | 5/2008 | Dowling | 455/296 |
| 2003/0236098 | A1 | 12/2003 | Hayoun | |
| 2009/0023448 | A1 * | 1/2009 | Attar et al. | 455/436 |
| 2009/0285340 | A1 * | 11/2009 | Ichihara | 375/345 |

FOREIGN PATENT DOCUMENTS

| CN | 1731388 A | 2/2006 |
| CN | 1809043 A | 7/2006 |
| CN | 1822527 A | 8/2006 |
| CN | 1849597 A | 10/2006 |
| CN | 101291517 B | 1/2012 |
| EP | 0455 614 A1 | 11/1991 |
| WO | WO 00/30384 | 5/2000 |
| WO | WO-2004/109536 A1 | 12/2004 |

* cited by examiner

*Primary Examiner* — Sam K Ahn
*Assistant Examiner* — Freshteh N Aghdam
(74) *Attorney, Agent, or Firm* — Brinks Hofer Gilson & Lione

(57) ABSTRACT

A measurement processing method is provided. The method includes performing physical layer filtering on measurement sample data obtained in measurement to obtain measurement values. Time-frequency domain normalization filtering may be performed on the obtained measurement values to obtain a measurement result, which, in turn may be evaluated. A measurement processing apparatus is further provided. The measurement processing solutions solve problems in the prior art such as that time domain and frequency domain characteristics of the measurement values are not considered when Layer 3 filtering is performed, and that the system must process more measurement sample data if Layer 3 filtering is not used. In the solutions, time-frequency domain normalization filtering is performed on the measurement values obtained after physical layer filtering to obtain a final measurement result, so that a more accurate measurement result is obtained, thus optimizing the network performance.

14 Claims, 2 Drawing Sheets

MEASUREMENT PROCESSING METHOD AND APPARATUS

CROSS-REFERENCE TO RELATED APPLICATION

This application is a continuation of PCT Application No. PCT/CN2008/070650, filed on Apr. 1, 2008, which claims priority to Chinese Application No. CN 200710074081.X, filed on Apr. 17, 2007, titled "Measurement Processing Method", the entire contents of all are which are incorporated herein by reference in their entireties.

TECHNICAL FIELD

The disclosed embodiments relate to the field of communication technology, and more particularly to a measurement processing method and apparatus.

BACKGROUND

Universal Mobile Telecommunications System (UMTS) is a third generation (3G) mobile communication system using a Wideband Code Division Multiple Access (WCDMA) air interface technology. With the development of 3G mobile communication systems, in order to adopt high-speed wireless access technologies such as Worldwide Interoperability for Microwave Access (WiMAX) in UMTS to maintain the vitality and competitiveness of the WCDMA/Global System for Mobile Communications (GSM) in 3GPP standards, the $3^{rd}$ Generation Partnership Project (3GPP) proposed the UMTS Long Term Evolution (LTE), in which the physical layer is based on Orthogonal Frequency Division Multiple (OFDM) access technologies.

In the LTE physical layer, the system bandwidth may be 1.25 MHz, 1.6 MHz, 2.5 MHz, 5 MHz, 10 MHz, 15 MHz, or 20 MHz, and system resources are time-frequency resources. That is, the LTE physical layer includes two-dimensional resources in the time domain and frequency domain. In an LTE system, a sub-carrier occupies a bandwidth of 15 KHz, each frame is 10 ms long and consists of twenty time slots, each time slot contains seven OFDM symbols, and there are pilots in both the LTE uplink and downlink channels. For example, as shown in FIG. 1, the downlink pilots are located at the first and fifth OFDM symbols of each time slot in the time domain.

In a UMTS WCDMA system, in order to support the mobility of the system, the quality of a pilot signal needs to be measured. Likewise, for the LTE system, the quality of the pilot signal also needs to be measured.

Currently, a measurement model of a network side and a terminal side in a WCDMA system is as shown in FIG. 2.

In the model shown in FIG. 2:

A represents measurement sample data obtained through measurement in a physical layer;

Layer 1 filtering represents physical layer filtering performed on the input measurement sample data A;

B represents a measurement value obtained after the physical layer filtering;

Layer 3 filtering represents high layer filtering performed on the measurement value B;

C represents a measurement result obtained after the high layer filtering; and

D represents a measurement report.

For the network side, evaluation of reporting criteria represents a process for determining whether a high layer at the network side needs to perform a corresponding radio resource management (RRM) according to the measurement result C; and for the terminal side, evaluation of reporting criteria represents a process for determining whether the terminal side needs to send the measurement report D to the high layer at the network side.

Based on the model, a solution for processing the measurement sample data at the terminal side in the WCDMA system specifically includes the following steps.

In step a, the physical layer at the terminal side performs a measurement to obtain measurement sample data.

In step b, the physical layer at the terminal side performs physical layer filtering on the measurement sample data to obtain a measurement value, and provides the obtained measurement value to the high layer at the terminal side.

In step c, the high layer at the terminal side filters the received measurement value according to equation (1), and a measurement result is obtained.

$$F_n = (1-a) \cdot F_{n-1} + a \cdot M_n \tag{1}$$

Here, $F_n$ represents a measurement result obtained after the current filtering operation; $F_{n-1}$ represents a measurement result obtained after a previous filtering operation; $M_n$ represents a measurement value currently received from the physical layer; n is a natural number; $F_0$ is equal to the first measurement value $M_1$ received from the physical layer; and $a = \frac{1}{2}^{(k/2)}$, where k is a filtering coefficient.

The operation specifically includes performing slide filtering on the current measurement value and the measurement result obtained after the previous operation. That is, the current measurement value and the measurement result obtained after the previous operation may be multiplied by a respective weighting coefficient and added to the results, so as to obtain a current measurement result. Here, the sum of the two weighting coefficients is 1.

In step d, according to each measurement result obtained after filtering, the high layer at the terminal side determines whether a measurement report sent to the high layer at the network side needs to be triggered, or whether other RRM processes need to be triggered.

For example, after determining that the obtained measurement result $F_3$ exceeds a preset measurement value, the high layer at the terminal side may determine that the measurement report needs to be sent to the high layer at the network side.

For the network side, the process is similar to process described above, and the difference lies in that when performing the operation corresponding to step d, the high layer at the network side specifically determines whether a corresponding RRM process needs to be performed or not according to each measurement result obtained after filtering.

Through the above process, the measurement of a signal, including measurement of the quality of a pilot signal can be realized.

However, the inventor found that in the WCDMA system, the measurement frequency bands of all measurement sample data are the same, and the above measurement process is mainly directed to different measurement sample data in the time domain. However, in the LTE system, different measurement sample data corresponds to different carrier frequencies and bandwidths in a measurement frequency band. Apparently, in this case, if the existing Layer 3 filtering in the WCDMA system is adopted in the LTE system, time domain and frequency domain characteristics of the measurement sample data in LTE signals are not considered.

If the LTE system does not perform Layer 3 filtering on the measurement value, the system has to process more measurement sample data, which will result in unnecessary memory occupation and long measurement duration. Meanwhile, because there is no uniform and effective Layer 3 filtering method, different manufacturers may use different filtering methods, which will inevitably cause inconsistent measurement results, thus affecting the network performance.

SUMMARY

Accordingly, the disclosed embodiments are directed to a measurement processing method and apparatus, so as to optimize network performance.

A measurement processing method is provided. The method may include the following steps.

Physical layer filtering is performed on measurement sample data obtained by measurement to obtain measurement values.

Time-frequency domain normalization filtering is performed on the obtained measurement values to obtain a measurement result.

The obtained measurement result is evaluated.

A measurement processing apparatus is further provided. The apparatus may include a measuring unit, a physical layer filtering unit, a high layer filtering unit, and a measurement result evaluating unit.

The measuring unit is configured to send measurement sample data obtained through measurement to the physical layer filtering unit.

The physical layer filtering unit is configured to perform physical layer filtering on the received measurement sample data to obtain measurement values, and send the obtained measurement values to the high layer filtering unit.

The high layer filtering unit is configured to perform time-frequency domain normalization filtering on the received measurement values to obtain a measurement result, and send the obtained measurement result to the measurement result evaluating unit.

The measurement result evaluating unit is configured to evaluate the received measurement result.

In the measurement processing solutions consistent with some embodiments, physical layer filtering is performed on the measurement sample data obtained through measurement to obtain measurement values, and then time-frequency domain normalization filtering is performed on the measurement values to obtain a final measurement result. Thus, both time domain and frequency domain characteristics of the measurement sample data are considered in the solutions, so that a more accurate measurement result is obtained, and the network performance is optimized.

DETAILED DESCRIPTION

In order to the make the objectives, technical solutions, and advantages of the disclosed embodiments more comprehensible, examples are further described in detail below with reference to the accompanying drawings.

Figure 1:
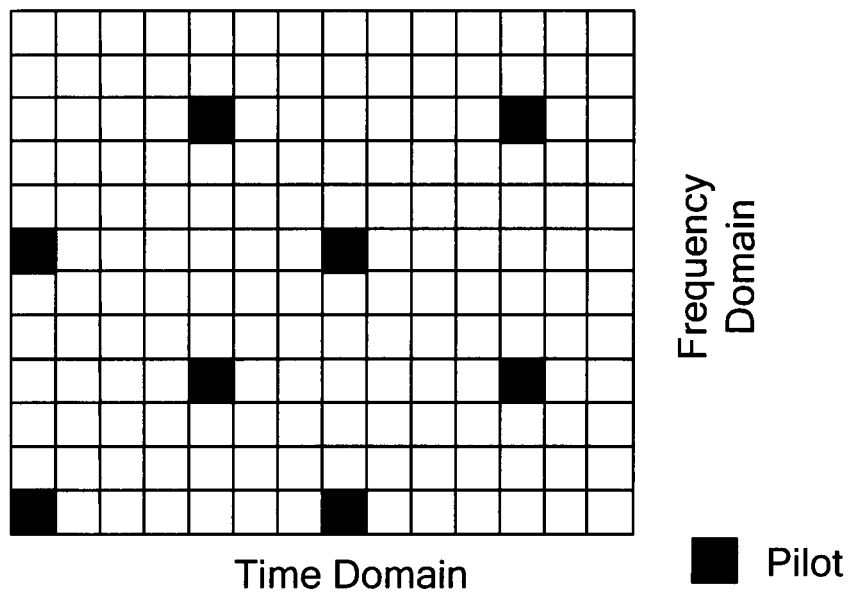
FIG. 1 is a schematic view showing positions of downlink pilots in a time domain in the prior art.
Figure 2:
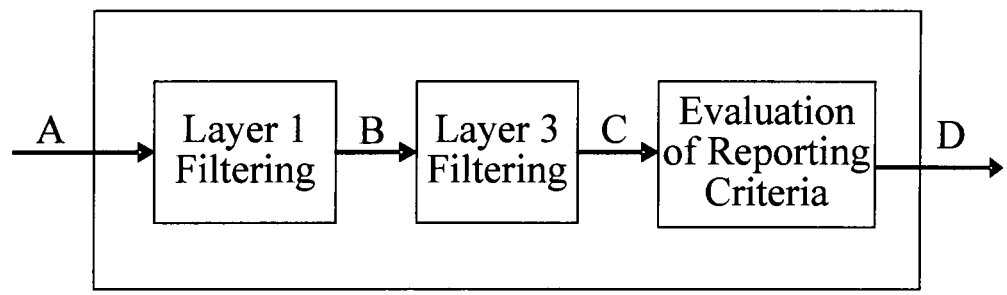
FIG. 2 is a schematic view of a measurement model in a WCDMA system in the prior art.
Figure 3:
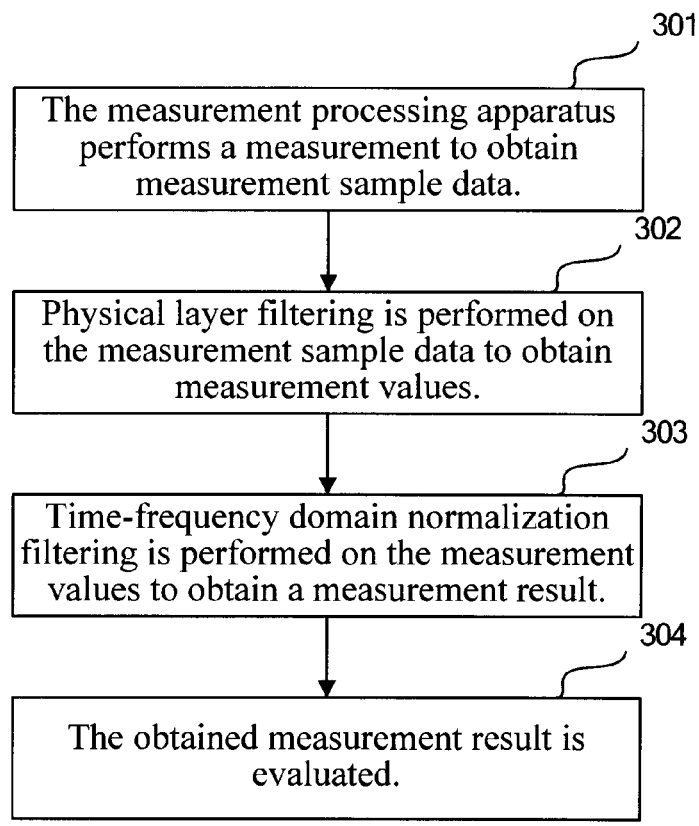
FIG. 3 is a flow chart of a measurement processing method consistent with some embodiments.

FIG. 3 is a flow chart of a measurement processing method consistent with some embodiments. Referring to FIG. 3, the method may include the following steps. Here, a measurement processing apparatus may be terminal equipment, or network side equipment.

In step 301, the measurement processing apparatus performs a measurement to obtain measurement sample data. Specifically, the measurement may be performed by the physical layer of the measurement processing apparatus.

In the measurement sample data $M_{kn}$ obtained in this step, k represents a sub-carrier of the measurement sample data, and n represent that the measurement sample data is the $n^{th}$ data on a time axis. Usually, K takes several finite values only, and n takes more values, so that a plurality of the measurement sample data $M_{kn}$ may be corresponding to the same sub-carrier.

In step 302, physical layer filtering is performed on the measurement sample data to obtain measurement values. Specifically, the operation may be as follows: the physical layer filtering is performed to obtain the measurement values, and the obtained measurement values are provided to a high layer of the measurement processing apparatus.

In step 303, time-frequency domain normalization filtering is performed on the measurement values to obtain a measurement result. Specifically, the operation may be performed by the high layer of the measurement processing apparatus.

In step 304, the obtained measurement result is evaluated. Specifically, the evaluation may be as follows: the high layer of the measurement processing apparatus performs the evaluation to determine a subsequent operation to be performed. For example, it may be determined whether an RRM process such as a measurement report or handover needs to be triggered or not according to the measurement result.

Through the above process, the measurement of the measurement sample data may be realized. Here, specifically, the time-frequency domain normalization filtering in step 303 may use the following methods, which are described in detail as follows.

For example, the time-frequency domain normalization filtering may be performed according to frequency domains of the measurement values. That is, normalization filtering may be performed on the measurement values according to different frequency domains by using equation (2).

$$F_n = (1-a) \cdot F_{n-1} + a(k_1 M_{11} + k_2 M_{22} + \ldots + k_k \cdot M_{kn}) \quad (2)$$

Here, $F_n$ represents a measurement result obtained after the current filtering operation; $F_{n-1}$ represents a measurement result obtained after a previous filtering operation; n is a natural number; $F_0$ is a measurement value sent from the physical layer after performing the first physical layer filtering operation. That is, $M_{11}$; the parameter $k_k$ represents a coefficient of the sub-carrier where the measurement sample data locates; and a may take a value as required by the system. For example, it is possible that $a = \frac{1}{2}^{(k/2)}$, where k is a filtering coefficient, or $a = 1/k$, and alternatively, a may also take other values.

Specifically, the operation may include: normalizing n continuous measurement values on k sub-carriers according to frequency domains thereof respectively. That is, each measurement value may be multiplied by a coefficient of a corresponding sub-carrier, and then filtered, e.g., slide filtering, on the obtained results and the measurement result obtained after the previous operation, i.e., multiplying the obtained results and the measurement result obtained after the previous operation by a respective weighting coefficient and summing up the results, so as to obtain a current measurement result. Here, the sum of the two weighting coefficients is 1.

The time-frequency domain normalization filtering may also be a filtering operation performed on the measurement values by using equation (3).

$$F_n = (1-a) \cdot F_{n-1} + a_1 M_{11} + a_2 M_{22} + \ldots + a_k M_{kn} \quad (3)$$

Here, $F_n$ represents a measurement result obtained after the current filtering operation; $F_{n-1}$ represents a measurement result obtained after a previous filtering operation; n is a natural number; $F_0$ is equal to the first measurement value $M_{11}$ received from the physical layer; k represents a sub-carrier of the measurement sample data; and $a_k$ needs to satisfy the following equation (4), and $a_k$ may take a same value or different values for the same frequency domain information.

$$a_1 + a_2 + \ldots + a_k = a \quad (4)$$

Specifically, the operation may include: performing filtering, e.g., slide filtering, on n continuous measurement values on k sub-carriers and the measurement result obtained after the previous operation. That is, multiplying each measurement value by a weighting coefficient of a corresponding sub-carrier, and then multiplying the obtained n values and the measurement result obtained after the previous operation by n+1 weighting coefficients respectively and summing up the results, so as to obtain a current measurement result. Here, the sum of the n+1 weighting coefficients is 1.

The time-frequency domain normalization filtering may also be a frequency domain normalization operation. That is, the frequency domain normalization operation may use a method as shown by equation (5).

$$F_n = (1-a) \cdot F_{n-1} + a \cdot k_m \cdot M_{mn-1} \quad (5)$$

Here, $F_0$ is equal to the first measurement value $M_{11}$ received from the physical layer; and $k_m$ is a normalized parameter of different carrier frequencies corresponding to a selected normalized carrier frequency. The normalized carrier frequency may directly be a central carrier frequency in a frequency band or measurement bandwidth, or be selected according to sub-carrier frequencies, multi-path environment, signal change, operation mode of the system, and the like; and a ratio or signal difference between other carrier frequencies and the selected normalized carrier frequency is the normalized parameter. As described above, a may take a value as required by the system, for example, it is possible that $a = \frac{1}{2}^{(k/2)}$, where k is a filtering coefficient.

Specifically, the operation may include: normalizing a selected normalized carrier frequency by using a measurement value on the current sub-carrier $k_m$ according to a frequency domain thereof. That is, the measurement value may be multiplied by a normalized parameter of a normalized carrier frequency selected for a corresponding sub-carrier, slide filtering may be performed on the obtained result and the measurement result obtained after the previous operation. That is, the obtained result and the measurement result obtained after the previous operation may be multiplied by a respective weighting coefficient and added to the results, so as to obtain a current measurement result. Here, the sum of the two weighting coefficients is 1.

In addition, all of the above operations adopt linear filtering. Consistent with some embodiments, nonlinear filtering may also be adopted, and at this time, the slide filtering operations corresponding to the above equations may be changed into nonlinear filtering operations. For the above equations, non-first-order $F_{n-1}$ and $M_{kn}$ may be used in the equations.

In the above embodiment, specific steps of the time-frequency domain normalization filtering operation performed by the measurement processing apparatus on the measurement sample data at the high layer may be provided. The measurement sample data processed in the physical layer filtering operation performed by the physical layer of the measurement processing apparatus before the operation also have time domain and frequency domain characteristics. In order to achieve a better measurement processing effect, some embodiments further provide specific steps of the time-frequency domain physical layer filtering operation performed by the physical layer of the measurement processing apparatus on the measurement sample data. The specific steps of the time-frequency domain physical layer filtering operation performed by the physical layer of the measurement processing apparatus in some embodiments are described in detail as follows.

The time-frequency domain physical layer filtering operation performed by the physical layer of the measurement processing apparatus is mainly to filter measurement sample data at different sub-carrier frequencies in the time domains and frequency domains at the same time or in the same cycle. Specifically, the cycle is a measurement cycle, which is generally related to multi-path environment, signal change, operation mode of the system, and the like. The physical layer filtering operation may also adopt the processing methods corresponding to equations (2), (3), and (5); and the difference lies in that, for the physical layer filtering operation, $M_{kn}$ in the equations represents measurement sample data obtained by the physical layer through measurement, rather than the measurement value obtained after the physical layer processing, and $F_0$ represents a corresponding value of the first measurement sample data.

The physical layer filtering operation may also adopt Layer 3 filtering in the WCDMA. That is, the physical layer filtering operation may adopt the processing method as shown by equation (1). Specifically, the operation may include: performing slide filtering on the current measurement sample data and the measurement value obtained after the previous operation. For the first measurement value obtained by the physical layer filtering operation, the corresponding measurement value obtained after the previous operation is set to a corresponding value of the first measurement sample data. That is to say, in equation (1), $F_0$ represents a corresponding value of the first measurement sample data.

In addition, similar linear filtering may also be adopted without considering the measurement value obtained after the previous operation of the physical layer, and the corresponding equation (6) is as follows.

$$F_n = a_1 M_{1n} + a_2 M_{2n} + \ldots + a_k M_{kn} \quad (6)$$

Here, $F_n$ represents a measurement result obtained after the current filtering operation; n is a natural number; $a_k$ also needs to satisfy equation (4), and $a_k$ may take the same value or different values for the same frequency domain information.

Specifically, the operation includes: normalizing n continuous measurement sample data on k sub-carriers according to frequency domains thereof. That is, each measurement sample data may be multiplied by a coefficient of a corresponding sub-carrier and added to the results, so as to obtain a current measurement value. Here, the sum of all weighting coefficients is a.

Similar to the time-frequency domain filtering operation of the measurement processing apparatus, the measurement processing apparatus may also adopt nonlinear physical layer filtering. That is, the slide filtering operations corresponding to the above equations may be changed into nonlinear filtering operations.

In addition, the physical layer of the measurement processing apparatus may also process all the measurement sample data by using an averaging algorithm. That is, all the measurement sample data may be filtered by using equation (7).

$$F_n=(M_{1n}+M_{2n}+\ldots+M_{kn})/n \qquad (7)$$

The physical layer filtering operation may specifically include: averaging n measurement sample data $M_{11}, \ldots, M_{kn}$.

In the measurement processing solutions provided by the above embodiments, time-frequency domain normalization filtering is performed on the measurement values obtained after physical layer filtering, accordingly, a final measurement result is obtained. Thus, both time domain and frequency domain characteristics of the measurement sample data may be considered when the normalization filtering is performed. Therefore, a more accurate measurement result may be obtained, and the network performance may be optimized.

The above embodiments may also provide various filtering schemes for physical layer filtering, as well as processing schemes for the time domain and frequency domain characteristics of the measurement sample data, thus further ensuring the accuracy of the measurement result.

Moreover, the application of the measurement processing solutions provided by the above embodiments is not limited to the LTE system, but may include similar measurement processing of other systems.

In addition, by uniformly using the processing schemes provided by the above embodiments, different manufacturers can obtain consistent measurement results, thus ensuring the stability of the network performance.

Figure 4:
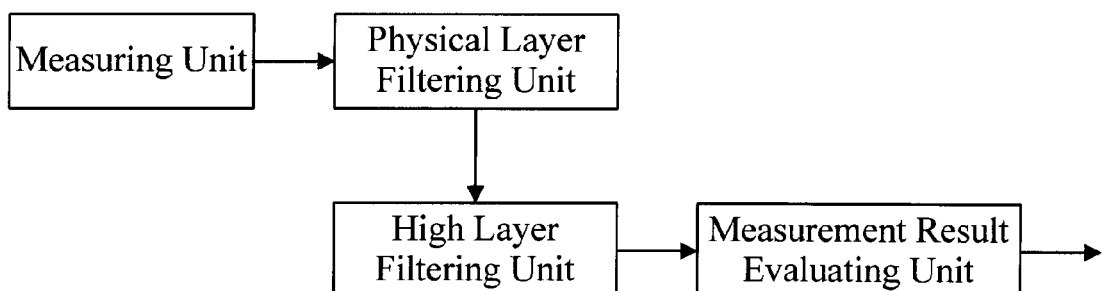
FIG. 4 is a schematic structural view of a measurement processing apparatus consistent with some embodiments.

The measurement processing apparatus may be included in a structure as shown in FIG. 4, in order to implement the above operations. The measurement processing apparatus may include among other components a measuring unit, a physical layer filtering unit, a high layer filtering unit, and a measurement result evaluating unit.

The measuring unit may be configured to send measurement sample data obtained by measurement to the physical layer filtering unit. Specifically, the measurement may be performed inside a physical layer located at a terminal side and a network side.

The physical layer filtering unit may be configured to perform physical layer filtering on the received measurement sample data to obtain measurement values, and send the obtained measurement values to the high layer filtering unit. Specifically, the unit may be located at the physical layer of the terminal side and the network side.

The high layer filtering unit may be configured to perform time-frequency domain normalization filtering on the received measurement values to obtain a measurement result, and send the obtained measurement result to the measurement result evaluating unit. Specifically, the unit may be located at a high layer of the terminal side and the network side.

The measurement result evaluating unit may be configured to evaluate the received measurement result.

The high layer filtering unit may process frequency domains of the received measurement values. That is, the high layer filtering unit may perform normalization filtering on the measurement values according to different frequency domains. Specifically, the high layer filtering unit normalizes n continuous measurement values on k sub-carriers according to frequency domains thereof respectively. That is, the high layer filtering unit multiplies each measurement value by a coefficient of a corresponding sub-carrier, and then performs slide filtering on the obtained results and the measurement result obtained after the previous operation. That is, the high layer filtering unit multiplies the obtained results and the measurement result obtained after the previous operation by a respective weighting coefficient and sums up the results, so as to obtain a current measurement result. Here, the sum of the two weighting coefficients is 1. Specifically, the operation may be performed based on equation (2).

The high layer filtering unit may also perform normalization filtering on the received measurement values. Specifically, the high layer filtering unit performs slide filtering on n continuous measurement values on k sub-carriers and the measurement result obtained after the previous operation. That is, the high layer filtering unit multiplies each measurement value by a weighting coefficient of a corresponding sub-carrier, and then multiplies the obtained n values and the measurement result obtained after the previous operation by n+1 weighting coefficients respectively and sums up the results, so as to obtain a current measurement result. Here, the sum of the n+1 weighting coefficients is 1. Specifically, the operation may be performed based on equation (3).

The high layer filtering unit may also perform a frequency domain normalization operation on the received measurement values. Specifically, the high layer filtering unit normalizes a selected normalized carrier frequency by using a measurement value on the current sub-carrier $k_m$ according to a frequency domain thereof. That is, the high layer filtering unit multiplies the measurement value by a normalized parameter of a normalized carrier frequency selected for a corresponding sub-carrier, and then performs slide filtering on the obtained result and the measurement result obtained after the previous operation. The high layer filtering unit multiplies the obtained result and the measurement result obtained after the previous operation by a respective weighting coefficient and sums up the results, so as to obtain a current measurement result. Here, the sum of the two weighting coefficients is 1. Specifically, the operation may be performed based on equation (5).

The high layer filtering unit may also perform nonlinear filtering on the received measurement sample data.

In some cases, when the high layer filtering unit performs the normalization filtering, for the first measurement result obtained by the normalization filtering operation, the measurement result obtained after the previous operation corresponding thereto is set to the first measurement value obtained after the physical layer filtering unit performs the physical layer filtering operation.

In addition, the physical layer filtering unit may not only adopt the physical layer filtering in the existing WCDMA system as shown by equation (1), but also adopt the processing methods corresponding to equations (2), (3), and (5), and may also adopt similar linear filtering as shown by equation (6) without considering the measurement value obtained after the previous operation of the physical layer, or directly process all the measurement sample data by using an averaging algorithm as shown by equation (7).

Specifically, the physical layer filtering unit may perform slide filtering on the received measurement sample data and the measurement value obtained after the previous operation. That is, the physical layer filtering unit may multiply the received measurement sample data and the measurement value obtained after the previous operation by a respective weighting coefficient and sum up the results, so as to obtain a current measurement value. Here, the sum of the two weighting coefficients is 1. Specifically, the operation may be performed based on equation (1).

The physical layer filtering unit may also process frequency domains of the received measurement sample data.

That is, the physical layer filtering unit may perform normalization filtering on the measurement sample data according to different frequency domains. Specifically, the physical layer filtering unit normalizes n continuous measurement sample data on k sub-carriers according to frequency domains thereof, respectively. That is, the physical layer filtering unit multiplies each measurement sample data by a coefficient of a corresponding sub-carrier, and then performs slide filtering on the obtained results and the measurement value obtained after the previous operation. The physical layer filtering unit multiplies the obtained results and the measurement value obtained after the previous operation by a respective weighting coefficient and sums up the results, so as to obtain a current measurement value. Here, the sum of the two weighting coefficients is 1. Specifically, the operation may be performed based on equation (2).

The physical layer filtering unit may also perform normalization filtering on the received measurement sample data. Specifically, the physical layer filtering unit performs slide filtering on n continuous measurement sample data on k sub-carriers and the measurement value obtained after the previous operation. That is, the physical layer filtering unit multiplies each measurement sample data by a weighting coefficient of a corresponding sub-carrier, and then multiplies the obtained n values and the measurement value obtained after the previous operation by n+1 weighting coefficients respectively and sums up the results, so as to obtain a current measurement value. Here, the sum of the n+1 weighting coefficients is 1. Specifically, the operation may be performed based on equation (3).

The physical layer filtering unit may also perform a frequency domain normalization operation on the received measurement sample data. Specifically, the physical layer filtering unit normalizes a selected normalized carrier frequency by using the measurement sample data on the current sub-carrier $k_m$ according to a frequency domain thereof. That is, the physical layer filtering unit multiplies the measurement sample data by a normalized parameter of a normalized carrier frequency selected for a corresponding sub-carrier, and then performs slide filtering on the obtained result and the measurement value obtained after the previous operation. The physical layer filtering unit multiplies the obtained result and the measurement value obtained after the previous operation by a respective weighting coefficient and sums up the results, so as to obtain a current measurement value. Here, the sum of the two weighting coefficients is 1. Specifically, the operation may be performed based on equation (5).

In some cases, when the physical layer filtering unit performs physical layer filtering, for the first measurement value obtained by the physical layer filtering operation, the corresponding measurement value obtained after the previous operation is set to a corresponding value of the first measurement sample data.

The physical layer filtering unit may also perform similar linear filtering on the received measurement sample data without considering the measurement value obtained after the previous operation of the physical layer. Specifically, the physical layer filtering unit normalizes n continuous measurement sample data on k sub-carriers according to frequency domains thereof. That is, the physical layer filtering unit multiplies each measurement sample data by a coefficient of a corresponding sub-carrier and sums up the results, so as to obtain a current measurement value. Here, the sum of all weighting coefficients is 1−a. Specifically, the operation may be performed based on equation (6).

The physical layer filtering unit may also perform nonlinear filtering on the received measurement sample data.

In addition, the physical layer filtering unit may also process the received measurement sample data by using an averaging algorithm. For example, the physical layer filtering unit may use the average n measurement sample data. Specifically, the operation may be performed based on equation (7).

As described in the above embodiments, the physical layer filtering unit and the high layer filtering unit in the measurement processing apparatus may also adopt nonlinear filtering instead of slide filtering.

In some embodiments, the physical layer filtering unit may be specifically disposed in Layer 1 of the measurement processing apparatus, and the high layer filtering unit may be disposed in Layer 3 of the apparatus.

In the measurement processing solutions provided by the above embodiments, time-frequency domain normalization filtering may be performed on the measurement values obtained after physical layer filtering of the measurement sample data obtained in the measurement to obtain a final measurement result. Thus, both time domain and frequency domain characteristics of the measurement sample data may be considered when the normalization filtering is performed. Therefore, a more accurate measurement result may be obtained, thus optimizing the network performance.

The above embodiments also provide various filtering schemes for physical layer filtering, as well as processing schemes for the time domain and frequency domain characteristics of the measurement sample data, thus further ensuring the accuracy of the measurement result.

Moreover, the application of the measurement processing solutions provided by the above embodiments is not limited to the LTE system, but may also include similar measurement processing of other systems.

In addition, by uniformly using the processing schemes provided by the above embodiments, different manufacturers can obtain consistent measurement results, thus ensuring the stability of the network performance.

Although the disclosed embodiments have been illustrated and described through some exemplary embodiments, it should be understood by persons of ordinary skill in the art that variations may be made to the disclosed embodiments without departing from the spirit and scope of the embodiments.

What is claimed is:

1. A measurement processing method, comprising:
performing, by a physical layer filtering unit, physical layer filtering on measurement sample data to obtain measurement values;
performing, by a high layer filtering unit, time-frequency domain normalization filtering on the obtained measurement values to obtain a measurement result; and
evaluating, by a measurement result evaluating unit, the measurement result,
wherein the physical layer filtering unit performs the physical layer filtering on measurement sample data by using the following equation:

$$F_n = (1-a) \cdot F_{n-1} + a_1 M_{11} + a_2 M_{22} + \ldots + a_k M_{kn}$$

wherein $F_n$ represents measurement result obtained after current filtering operation; $F_{n-1}$ represents measurement result obtained after previous filtering operation; n is a natural number; k represents a sub-carrier of the measurement sample data; $M_{kn}$ represents the $N_{th}$ measurement sample data; and $a_k$ represents a coefficient that satisfies $a_1 + a_2 + \ldots + a_k = a$.

2. The method according to claim 1, further comprising:
performing time-frequency domain normalization filtering on the obtained measurement values by using the following equation:

$$F_n=(1-a)\cdot F_{n-1}+a(k_1M_{11}+k_2M_{22}+\ldots+k_k\cdot M_{kn})$$

wherein $F_n$ represents measurement result obtained after current filtering operation; $F_{n-1}$ represents measurement result obtained after previous filtering operation; n is a natural number; $k_k$ represents a coefficient of a sub-carrier of measurement sample data; a takes a value as required by system; and $M_{kn}$ represents the $N_{th}$ continuous measurement values.

3. The method according to claim 1, further comprising:
performing time-frequency domain normalization filtering on the obtained measurement values by using the following equation:

$$F_n=(1-a)\cdot F_{n-1}+a_1M_{11}+a_2M_{22}+\ldots+a_kM_{kn}$$

wherein $F_n$ represents measurement result obtained after current filtering operation; $F_{n-1}$ represents measurement result obtained after previous filtering operation; n is a natural number; k represents a sub-carrier of the measurement sample data; $M_{kn}$ represents the $N_{th}$ continuous measurement values; and $a_k$ satisfies $a_1+a_2+\ldots+a_k=a$.

4. The method according to claim 1, further comprising:
performing time-frequency domain normalization filtering on the obtained measurement values by using the following equation:

$$F_n=(1-a)\cdot F_{n-1}+a\cdot k_m\cdot M_{mn-1}$$

wherein $F_n$ represents measurement result obtained after current filtering operation; $F_{n-1}$ represents measurement result obtained after previous filtering operation; n is a natural number; $k_m$ is a normalized parameter of different carrier frequencies corresponding to a selected normalized carrier frequency; and a takes a value as required by system.

5. The method according to claim 1, further comprising:
performing time-frequency domain normalization filtering on the obtained measurement values by using the following equation:

$$F_n=(1-a)\cdot F_{n-1}+a\cdot M_n$$

wherein $F_n$ represents measurement result obtained after current filtering operation; $F_{n-1}$ represents measurement result obtained after previous filtering operation; n is a natural number; $M_n$ represents the $N_{th}$ measurement sample data; and a takes a value as required by system.

6. The method according to claim 1, further comprising:
performing time-frequency domain normalization filtering on the obtained measurement values by using the following equation:

$$F_n=(1-a)\cdot F_{n-1}+a\cdot M_n$$

wherein $F_n$ represents measurement result obtained after current filtering operation; $F_{n-1}$ represents measurement result obtained after previous filtering operation; n is a natural number; $M_n$ represents the measurement value currently received from the physical layer; and $a=\frac{1}{2}^{(k/2)}$, wherein k is a filtering coefficient.

7. The method according to claim 1, wherein the filtering is slide filtering or nonlinear filtering.

8. The method according to claim 1, wherein the method is applied in a Long Term Evolution (LTE) system.

9. A measurement processing apparatus, comprising:
a measuring unit, configured to send measurement sample data obtained by measurement to a physical layer filtering unit;
the physical layer filtering unit, configured to perform physical layer filtering on the received measurement sample data to obtain measurement values and send the obtained measurement values to a high layer filtering unit; wherein the physical layer filtering unit is configured to perform physical layer filtering by using equation:

$$F_n=(1-a)\cdot F_{n-1}+a_1M_{11}+a_2M_{22}+\ldots+a_kM_{kn}$$

wherein $F_n$ represents measurement result obtained after current filtering operation; $F_{n-1}$ represents measurement result obtained after previous filtering operation; n is a natural number; k represents a sub-carrier of the measurement sample data; $M_{kn}$ represents the $N_{th}$ measurement sample data; and $a_k$ represents a coefficient that satisfies $a_1+a_2+\ldots+a_k=a$;
the high layer filtering unit, configured to perform time-frequency domain normalization filtering on the received measurement values to obtain a measurement result and send the obtained measurement result to a measurement result evaluating unit; and
the measurement result evaluating unit, configured to evaluate the received measurement result.

10. The measurement processing apparatus according to claim 9, wherein the high layer filtering unit is configured to perform time-frequency domain normalization filtering by using the following equation:

$$F_n=(1-a)\cdot F_{n-1}+a(k_1M_{11}+k_2M_{22}+\ldots+k_k\cdot M_{kn})$$

wherein $F_n$ represents measurement result obtained after current filtering operation; $F_{n-1}$ represents measurement result obtained after previous filtering operation; n is a natural number; $k_k$ represents a coefficient of a sub-carrier of measurement sample data; a takes a value as required by system; and $M_{kn}$ represents the $N_{th}$ continuous measurement values.

11. The measurement processing apparatus according to claim 9, wherein the high layer filtering unit is configured to perform time-frequency domain normalization filtering by using equation:

$$i\ F_n=(1-a)\cdot F_{n-1}+a_1M_{11}+a_2M_{22}+\ldots+a_kM_{kn}$$

wherein $F_n$ represents measurement result obtained after current filtering operation; $F_{n-1}$ represents measurement result obtained after previous filtering operation; n is a natural number; k represents a sub-carrier of the measurement sample data; $M_{kn}$ represents the $N_{th}$ continuous measurement values; and $a_k$ satisfies $a_1+a_2+\ldots+a_k=a$.

12. The measurement processing apparatus according to claim 9, wherein the high layer filtering unit is configured to perform time-frequency domain normalization filtering by using the following equation:

$$F_n=(1-a)\cdot F_{n-1}+a\cdot k_m\cdot M_{mn-1}$$

wherein $F_n$ represents measurement result obtained after current filtering operation; $F_{n-1}$ represents measurement result obtained after previous filtering operation; n is a natural number; $k_m$ is a normalized parameter of different carrier frequencies corresponding to a selected normalized carrier frequency; and a takes a value as required by system.

13. The measurement processing apparatus according to claim 9, wherein the physical layer filtering unit is disposed in Layer 1 of the measurement processing apparatus and the high layer filtering unit is disposed in Layer 3 of the measurement processing apparatus.

14. A measurement processing apparatus, comprising:

a physical layer filtering unit, configured to perform physical layer filtering on the received measurement sample data to obtain measurement values and send the obtained measurement values to a high layer filtering unit; wherein the physical layer filtering unit is configured to perform physical layer filtering by using equation:

$$i\ F_n = (1-a) \cdot F_{n-1} + a_1 M_{11} + a_2 M_{22} + \ldots + a_k M_{kn}$$

wherein $F_n$ represents measurement result obtained after current filtering operation; $F_{n-1}$ represents measurement result obtained after previous filtering operation; n is a natural number; k represents a sub-carrier of the measurement sample data; $M_{kn}$ represents the $N_{th}$ measurement sample data; and $a_k$ represents a coefficient that satisfies $a_1 + a_2 + \ldots + a_k = a$;

the high layer filtering unit, configured to perform time-frequency domain normalization filtering on the received measurement values to obtain a measurement result and send the obtained measurement result to a measurement result evaluating unit; and the measurement result evaluating unit, configured to evaluate the received measurement result.

* * * * *